(12) United States Patent
Chung et al.

(10) Patent No.: US 8,658,303 B2
(45) Date of Patent: Feb. 25, 2014

(54) MIDDLE OR LARGE-SIZED BATTERY PACK CASE OF EXCELLENT COOLING EFFICIENCY

(75) Inventors: Chae-Ho Chung, Daejeon (KR); Dal Mo Kang, Daejeon (KR); Ye-Hoon Im, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 188 days.

(21) Appl. No.: 13/055,602

(22) PCT Filed: Jul. 10, 2009

(86) PCT No.: PCT/KR2009/003781
§ 371 (c)(1),
(2), (4) Date: Mar. 24, 2011

(87) PCT Pub. No.: WO2010/013902
PCT Pub. Date: Feb. 4, 2010

(65) Prior Publication Data
US 2011/0177367 A1 Jul. 21, 2011

(30) Foreign Application Priority Data

Jul. 26, 2008 (KR) ........................ 10-2008-0073276

(51) Int. Cl.
*H01M 10/50* (2006.01)
(52) U.S. Cl.
USPC ................. 429/120; 429/62; 429/71; 429/83; 429/148
(58) Field of Classification Search
USPC ................... 429/120, 148, 62, 83, 71
See application file for complete search history.

(56) References Cited

U.S. PATENT DOCUMENTS

| | | | | |
|---|---|---|---|---|
| 6,482,542 | B1 * | 11/2002 | Takaki et al. ................ | 429/120 |
| 2003/0232239 | A1 * | 12/2003 | Gow et al. ................ | 429/120 |
| 2006/0090492 | A1 | 5/2006 | Ahn et al. | |
| 2006/0093901 | A1 | 5/2006 | Lee et al. | |

FOREIGN PATENT DOCUMENTS

| | | |
|---|---|---|
| DE | 10 2004 025 831 A1 | 12/2005 |
| JP | 2002-373709 A | 12/2002 |
| KR | 10-2006-0036694 B1 | 5/2006 |
| KR | 10-2006-0037600 A | 5/2006 |
| KR | 10-2006-0037601 B1 | 5/2006 |

(Continued)

OTHER PUBLICATIONS

International Search Report PCT/KR2009/003781 issued Jan. 27, 2010.

*Primary Examiner* — Nicholas P D'Aniello
(74) *Attorney, Agent, or Firm* — Birch, Stewart, Kolasch & Birch, LLP

(57) ABSTRACT

A middle or large-sized battery pack case having a plurality of stacked battery cells, a coolant inlet port and a coolant outlet port, and a flow space ('coolant introduction part') extending from the coolant inlet port to the battery module and another flow space ('coolant discharge part') extending from the battery module to the coolant outlet port, an upper end inside of the coolant introduction part facing the top of a unit cell stack is configured to have an inclined plane inclined from the end opposite to the coolant inlet port toward the coolant inlet port at a positive angle of 3 to 8 degrees to the top of the unit cell stack, and the coolant inlet port is inclined at an angle of 20 to 80 degrees.

18 Claims, 8 Drawing Sheets

(56) References Cited

FOREIGN PATENT DOCUMENTS

| KR | 10-2006-0037627 | B1 | 5/2006 |
|---|---|---|---|
| KR | 10-2007-0088994 | A | 8/2007 |
| KR | 10-2007-0112489 | A | 11/2007 |
| KR | 10-2007-0112490 | B1 | 11/2007 |
| KR | 10-0853621 | B1 | 8/2008 |
| WO | WO 2007/078147 | A1 | 7/2007 |
| WO | WO 2007/097594 | A1 | 8/2007 |

* cited by examiner

FIG. 12

| INCLINATION ANGLE A(°) OF INCLINED PLANE | INCLINATION ANGLE B (°) OF COOLANT INLET PORT | RELATIVE TEMPERATURE DEVIATION (%) |
|---|---|---|
| 2.6 | 45 | 12 |
| 3 | 45 | 11.5 |
| 4 | 20 | 8 |
| | 30 | 9 |
| | 45 | 10 |
| | 50 | 10 |
| | 60 | 11.5 |
| 5 | 45 | 11.5 |
| 8 | 30 | 14 |
| | 60 | 16 |
| 9.3 | 45 | 17 |

FIG. 13

| INCLINATION ANGLE A(°) OF INCLINED PLANE | RATIO OF WIDTH d OF COOLANT INLET PORT TO LENGTH OF PACK CASE (%) | RELATIVE TEMPERATURE DEVIATION (%) |
|---|---|---|
| 4 | 10 | 7 |
| | 20 | 8 |
| 8 | 10 | 11 |
| | 20 | 10 |

MIDDLE OR LARGE-SIZED BATTERY PACK CASE OF EXCELLENT COOLING EFFICIENCY

TECHNICAL FIELD

The present invention relates to a middle or large-sized battery pack case exhibiting excellent cooling efficiency, and, more particularly, to a middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions, the battery pack case being further provided with a coolant introduction part and a coolant discharge part, an upper end inside of the coolant introduction part facing the top of a unit cell stack is configured to have an inclined plane inclined from the end opposite to the coolant inlet port toward the coolant inlet port at a positive (+) angle (A) to the top of the unit cell stack, the coolant inlet port is inclined at an angle (B) greater than the inclination angle (A) of the inclined plane so as to correspond to the internal structure of a device in which the middle or large-sized battery pack case, including the battery module, is mounted, and the inclination angle (A) of the inclined plane is 3 to 8 degrees when the inclination angle (B) of the coolant inlet port is 20 to 80 degrees.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in REV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells are electrically connected in series to each other, and the battery cells can suitable resist external force.

Also, the battery cells constituting the middle or large-sized battery module are secondary batteries which can be charged and discharged. Consequently, a large amount of heat is generated from the high-power, large-capacity secondary batteries during the charge and discharge of the batteries. If the heat, generated from the battery cells during the charge and discharge of the battery cells, is not effectively removed, the heat accumulates in the battery cells, with the result that deterioration of the battery cells is accelerated. According to circumstances, the battery cells may catch fire or explode. For this reason, a cooling system is needed in a battery pack for vehicles, which is a high-power, large-capacity battery, to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the nonuniformity of the performance is non-uniform cooling between the battery cells. For this reason, it is necessary to provide a structure in which the shape of a coolant flow channel is optimized to minimize temperature deviation between the battery cells during the flow of a coolant.

Some conventional middle or large-sized battery packs use a battery pack case configured to have a structure in which a coolant inlet port and a coolant outlet port are disposed at the upper part and the lower part of the battery pack case so that the coolant inlet port and a coolant outlet port face in opposite directions, and the top and bottom of a flow space extending from the coolant inlet port to the battery module are parallel to each other. In this structure, however, a relatively high coolant flux is introduced into coolant flow channels defined between the battery cells adjacent to the coolant outlet port, whereas a relatively low coolant flux is introduced into coolant flow channels defined between the battery cells adjacent to the coolant inlet port, with the result that temperature deviation between the battery cells is high.

In connection with this matter, Korean Patent Application Publication No. 2006-0037600, No. 2006-0037601, and No. 2006-0037627 disclose a middle or large-sized battery pack configured to have a structure in which an air guide plane is inclined downward to a side opposite to battery cells so that the air guide plane becomes closer to the battery cells with the increase in distance between the air guide plane and a coolant inlet port. Specifically, the air guide plane is inclined at an angle of 15 to 45 degrees to the side opposite to the battery cells and the coolant inlet port is formed in parallel, thereby restraining the occurrence of a phenomenon in which coolant flux is excessively introduced into coolant flow channels defined between the battery cells adjacent to the coolant outlet port.

However, the inventors of the present application have found that, in a case in which the coolant inlet port is disposed higher than the pack case, i.e. for a middle or large-sized battery pack including a pack case configured so that the inclination of the coolant inlet port is greater than the inclination of the end opposite to the coolant inlet port in consideration of a device in which the pack case is installed, it is not possible to restrain the occurrence of a phenomenon in which coolant flux is excessively introduced into the coolant flow channels defined between the battery cells adjacent to the coolant outlet port when the inclination angle of the air guide plane is 15 to 45 degrees as described above with the result that the temperature deviation between the battery cells is increased, and therefore, it is not possible to achieve a desired level of cooling uniformity.

Consequently, there is a high necessity for a technology to fundamentally solve the above-mentioned problems.

DISCLOSURE

Technical Problem

Therefore, the present invention has been made to solve the above problems, and other technical problems that have yet to be resolved.

As a result of a variety of extensive and intensive studies and experiments on a middle or large-sized battery pack case, the inventors of the present application have found that, when an inclined plane has an inclination angle A of 3 to 8 degrees and a coolant inlet port has an inclination angle B of 20 to 80 degrees, it is possible to minimize temperature deviation between battery cells with the result that heat accumulating between the battery cells is effectively removed, and therefore, the performance and life span of the battery cells are greatly improved. The present invention has been completed based on these findings.

Technical Solution

In accordance with one aspect of the present invention, the above and other objects can be accomplished by the provision of a middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions so that a coolant for cooling the unit cells can flow from one side to the other side of the battery module in a direction perpendicular to a stacking direction of the unit cells, the battery pack case being further provided with a flow space ('a coolant introduction part') extending from the coolant inlet port to the battery module and another flow space ('a coolant discharge part') extending from the battery module to the coolant outlet port, an upper end inside of the coolant introduction part facing the top of a unit cell stack is configured to have an inclined plane inclined from the end opposite to the coolant inlet port toward the coolant inlet port at a positive (+) angle (A) to the top of the unit cell stack, the coolant inlet port is inclined at an angle (B) greater than the inclination angle (A) of the inclined plane so as to correspond to the internal structure of a device in which the middle or large-sized battery pack case, including the battery module, is mounted, and the inclination angle (A) of the inclined plane is 3 to 8 degrees when the inclination angle (B) of the coolant inlet port is 20 to 80 degrees.

That is, in the middle or large-sized battery pack case according to the present invention, the upper end inside of the coolant introduction part is configured to have an inclined plane inclined from the end opposite to the coolant inlet port toward the coolant inlet port at a positive (+) angle (A) to the top of the unit cell stack, and the coolant inlet port is inclined at an angle (B) greater than the inclination angle (A) of the inclined plane. Consequently, it is possible to easily achieve a desired level of cooling efficiency even when the position of the coolant inlet port is higher than the position of the battery pack case depending upon conditions in which the battery pack case is installed in a device.

Also, according to experimental results detailed in the present invention, when the inclination angle (A) of the inclined plane is set to 3 to 8 degrees in a case in which the inclination angle (B) of the coolant inlet port is 20 to 80 degrees, it is possible to minimize nonuniformity of a coolant flowing through coolant flow channels defined between the unit cells, thereby reducing temperature deviation between the unit cells caused during the charge and discharge of the unit cells to a proper temperature level or less. As a result, it is possible to increase life span of the battery cells and to enhance operational performance of the battery cells.

Here, the expression 'the inclined plane inclined at the positive (+) inclination angle (A)' means that the upper end inside of the coolant introduction part located at the coolant inlet port side is higher than the upper end inside of the coolant introduction part located at the side opposite to the coolant inlet port.

Also, the portion at which the inclination angle (B) of the coolant inlet port shifts to the inclination angle (A) of the inclined plane may be located at a position which is a distance equivalent to the length equivalent to 10 to 60% of the length of the battery pack case from the end of the battery pack case at which the coolant inlet port is located. The shift portion may have an angled structure or a gentle curved structure.

In a conventional middle or large-sized battery pack case, a structure in which the coolant inlet port is inclined at a greater angle than the upper end inside of the coolant introduction part was not considered because, when the inclination angle of the coolant inlet port is large, the introduction direction of the coolant is greatly affected, and therefore, cooling efficiency is reduced. According to conditions in which the middle or large-sized battery pack is mounted in a device, however, it is necessary to provide a structure in which the inclination angle of the coolant inlet port is large. The present invention provides particular conditions through which excellent cooling efficiency is achieved in such circumstances.

Experiments performed by the inventors of the present application revealed that, when the upper end inside of the coolant introduction part has a two-stage inclined structure in which the inclination angle (B) of the coolant inlet port is 20 to 80 degrees and the inclination angle (A) of the inclined plane is 3 to 8 degrees, it is possible to reduce temperature deviation of the coolant flowing between the unit cells, thereby further improving cooling efficiency than when the upper end inside of the coolant introduction part is parallel to the top of the unit cell stack or the upper end inside of the coolant introduction part has a single inclined structure.

Also, even when it is necessary for the inclination angle (B) of the coolant inlet port to be large according to conditions of a device in which the middle or large-sized battery pack is mounted, it is possible to effectively achieve a desired level of cooling efficiency through the particular structure of the upper end inside of the coolant introduction part as described above.

For example, when the device is a hybrid electric vehicle, the inclination angle of the coolant inlet port may be changed based on the internal structure of the vehicle so that a middle or large-sized battery pack case having a battery module mounted therein is installed in various positions. In this case, of course, it is possible to easily apply the middle or large-sized battery pack case according to the present invention that is capable of minimizing temperature deviation between the unit cells.

The battery module mounted in the middle or large-sized battery pack case according to the present invention is manufactured by stacking a plurality of unit cells at high density so that the unit cells are arranged at predetermined intervals to remove heat generated from the unit cells during the charge and discharge of the unit cells. For example, the battery cells may be sequentially stacked, so that the battery cells are arranged at predetermined intervals, without the use of additional members. Alternatively, when the battery cells have low mechanical strength, one or more battery cells are mounted in a predetermined mounting member, and a plurality of mounting members are stacked to constitute a battery module. In the latter case, the battery module is referred to as a 'unit module' in the present invention.

When a plurality of unit modules is stacked to constitute a battery module, coolant flow channels are defined between the battery cells and/or the unit modules to effectively remove heat accumulating between the stacked battery cells.

The coolant introduction part and the coolant discharge part are flow spaces through which a coolant to effectively remove heat generated from the battery cells due to the charge and discharge of the battery cells is introduced and discharged. The coolant introduction part and the coolant discharge part are formed at the upper part and the lower part of the battery pack case, respectively, so that the coolant introduction part and the coolant discharge part are directed in opposite directions. According to circumstances, the coolant introduction part and the coolant discharge part are formed at the lower part and the upper part of the battery pack case, respectively.

In a preferred example, the inclination angle (A) of the inclined plane may be 3 to 5 degrees. Experiments performed by the inventors of the present application revealed that, when the inclination angle (A) of the inclined plane has the above-defined range, it is possible to further reduce temperature deviation between the unit cells.

In another preferred example, the inclination angle (B) of the coolant inlet port may be 20 to 50 degrees. Generally, as the inclination angle (B) of the coolant inlet port decreases, a larger amount of the coolant introduced through the coolant inlet port can be moved to the coolant flow channels disposed at the end opposite to the coolant inlet port. However, the experiments performed by the inventors of the present application revealed that, when the inclination angle (B) of the coolant inlet port is 20 to 50 degrees in a case in which the inclination angle (A) of the inclined plane is 3 to 8 degrees, it is possible to reduce temperature deviation of the coolant.

Also, in addition to the case in which the upper end inside of the coolant introduction part is formed to have the previously described specific inclined structure, the width of the coolant inlet port affects temperature deviation between the unit cells.

That is, when the width of the coolant inlet port is 5 to 25% of the length of the battery pack case corresponding to the length of the unit cell stack, it is possible to more efficiently reduce temperature deviation of the coolant generated depending upon conditions in which the battery pack case is installed in a device. Preferably, the width of the coolant inlet port is 10 to 20% of the length of the battery pack case corresponding to the length of the unit cell stack.

Here, the width of the coolant inlet port may be uniform or variable. For example, the width of the coolant inlet port may be increased from the start point to the end point of the coolant inlet port in the direction in which the coolant is introduced into the battery pack case. Alternatively, the width of the coolant inlet port may decrease from the start point to the end point of the coolant inlet port in the direction in which the coolant is introduced into the battery pack case. At this time, the above-defined width of the coolant inlet port means an average width.

Also, the coolant inlet port may have a variety of different shapes. For example, the coolant inlet port may have a straight structure or a curved structure. At this time, the above-defined inclination angle (B) of the coolant inlet port means an inclination angle of the end point of the coolant inlet port in the direction in which the coolant is introduced into the battery pack case.

The end opposite to the coolant inlet port may be spaced apart from the top of the battery cell stack by a height equivalent to 10% or less of the height of the unit cell stack. In this structure, the amount of the coolant reaching the end opposite to the coolant inlet port is properly restricted, and therefore, it is possible to achieve more uniform distribution of the coolant to the unit cells.

In this case, the end opposite to the coolant inlet port may be spaced apart from the top of the battery cell stack by a height of 1 to 10 mm.

Meanwhile, the battery pack case according to the present invention is more preferably used in a structure in which the cooling efficiency is critical, i.e. a structure in which the length of the battery pack case corresponding to the stacking direction of the unit cells is greater than that of the battery pack case corresponding to the lateral direction of the unit cells.

The coolant discharge part may have a uniform height with respect to the bottom of the unit cell stack. That is, the lower end inside of the coolant discharge part facing the bottom of the unit cell stack may have a uniform height with respect to the bottom of the unit cell stack. Of course, however, the structure may be partially modified to improve coolant discharge efficiency.

According to circumstances, the battery pack case may be configured to have a structure in which a blowing fan is further mounted in the coolant inlet port or the coolant outlet port for moving the coolant, introduced through the coolant inlet port, to the coolant outlet port, after the coolant flows through the battery module, and discharging the coolant out of the battery pack case. In this structure, the coolant, introduced through the narrow coolant inlet port, sufficiently reaches the battery cells that are distant from the coolant inlet port, at a high flow speed of the coolant, by coolant driving force generated from the blowing fan, and therefore, the relatively uniform distribution of the coolant flux is achieved in the condition of the same coolant flux.

In accordance with another aspect of the present invention, there is provided a middle or large-sized battery pack configured to have a structure in which a battery module is mounted in the middle or large-sized battery pack case with the above-stated construction.

The term 'battery module' as used in the specification includes the structure of a battery system configured to have a structure in which two or more chargeable and dischargeable battery cells or unit modules are mechanically coupled and, at the same time, electrically connected to each other so as to provide high-power, large-capacity electricity. Therefore, the battery module itself may constitute a single apparatus or a part of the large-sized apparatus. For example, a plurality of small-sized battery modules may be connected to each other to constitute a large-sized battery module. Alternatively, a small number of battery cells may be connected to each other to constitute a unit module, and a plurality of the unit modules may be connected to each other.

Meanwhile, the unit module may be configured in various structures, a preferred example of which will be described hereinafter.

The unit module is configured to have a structure in which a plurality of plate-shaped battery cells, each of which has electrode terminals formed at the upper and lower ends thereof, are connected in series to each other. Specifically, the unit module may include two or more battery cells arranged in a stacked structure in which connections between the electrode terminals of the battery cells are bent and a high-strength cell cover coupled to the battery cells for covering the outer surfaces of the battery cells excluding the electrode terminals of the battery cells.

The plate-shaped battery cells are battery cells having a small thickness and a relatively large width and length so as to minimize the overall size of the battery cells when the battery cells are stacked to constitute a battery module. As a preferred example, a battery cell may be a secondary battery configured to have a structure in which an electrode assembly is mounted in a battery case formed of a laminate sheet including a resin layer and a metal layer, and electrode terminals protrude outward from the upper and lower ends of the battery case. Specifically, the battery cell may be configured to have a structure in which an electrode assembly is mounted in a pouch-shaped battery case formed of an aluminum laminate sheet. The secondary battery configured to have the above-described structure may be referred to as a pouch-shaped battery cell.

A unit module may be constituted by covering two or more battery cells with a high-strength cell cover, made of a synthetic resin or a metal material. The high-strength cell cover restrains the deformation of the battery cells due to repeated expansion and contraction of the battery cells during the charge and discharge of the battery cells, while protecting the battery cells having a low mechanical strength, thereby preventing the separation between the sealing regions of the battery cells. Eventually, therefore, it is possible to manufacture a middle or large-sized battery module exhibiting more excellent safety.

The battery cells are connected in series and/or parallel to each other in one unit module, or the battery cells of one unit module are connected in series and/or parallel to the battery cells of another unit module. In a preferred example, a plurality of unit modules may be manufactured by coupling electrode terminals of the battery cells to each other, while arranging the battery cells in series in the longitudinal direction, so that the electrode terminals of the battery cells are successively adjacent to each other, bending the battery cells by twos or more so that the battery cells are stacked, and covering the stacked battery cells by predetermined numbers with the cell covers.

Coupling between the electrode terminals may be achieved in various ways, such as welding, soldering, and mechanical coupling. Preferably, coupling between the electrode terminals is achieved by welding.

The battery cells or the unit modules, which are stacked in high integration while the electrode terminals are connected to each other, may be vertically mounted in the separable upper and lower frame members that are configured to be coupled to each other in the assembly-type coupling structure to constitute the rectangular battery module.

The details of a unit module and a rectangular battery module manufactured using a plurality of unit modules are disclosed in Korean Patent Application No. 2006-45443 and No. 2006-45444, which have been filed in the name of the applicant of the present application and the disclosure of which is incorporated herein by reference.

The middle or large-sized battery pack according to the present invention is well suited to use as a power source for electric vehicles, hybrid electric vehicles, and plug-in hybrid electric vehicles, the safety of which may seriously deteriorate due to high-temperature heat generated from a plurality of battery cells combined to provide high power and large capacity during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which:

FIG. 12 is a table illustrating the measurement results of FIGS. 6 to 9; and

FIG. 13 is a table illustrating the measurement results of FIGS. 10 and 11.

BEST MODE

Now, exemplary embodiments of the present invention will be described in detail with reference to the accompanying drawings. It should be noted, however, that the scope of the present invention is not limited by the illustrated embodiments.

Figure 1:
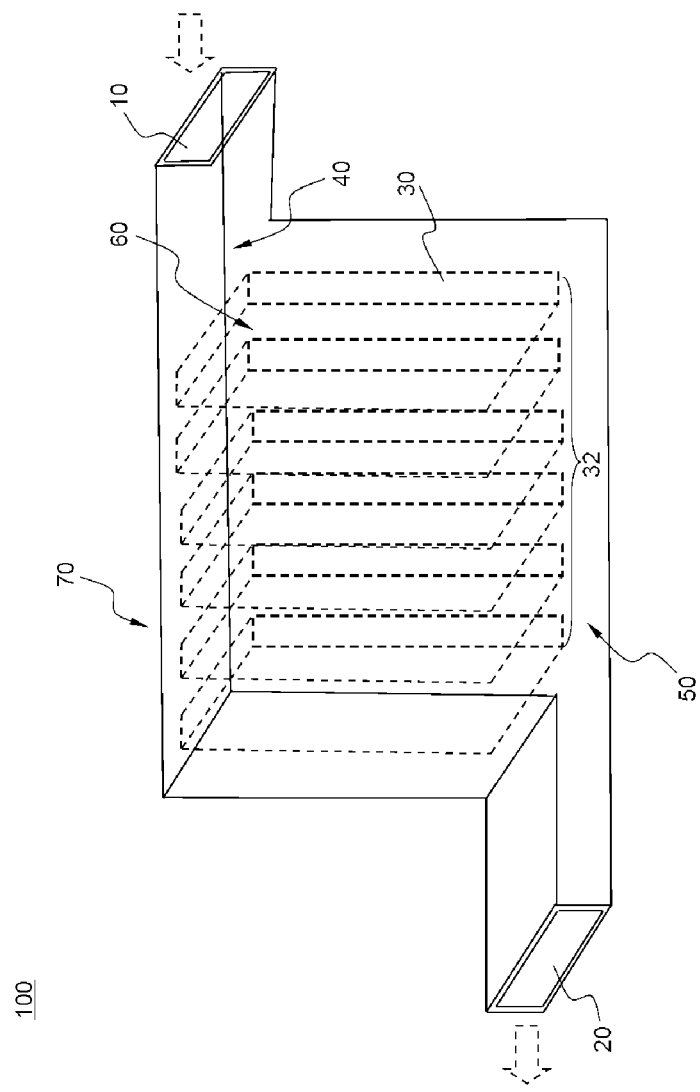
FIG. 1 is a perspective view illustrating a middle or large-sized battery pack configured to have a structure in which a battery module is mounted in a conventional middle or large-sized battery pack case.
Figure 2:
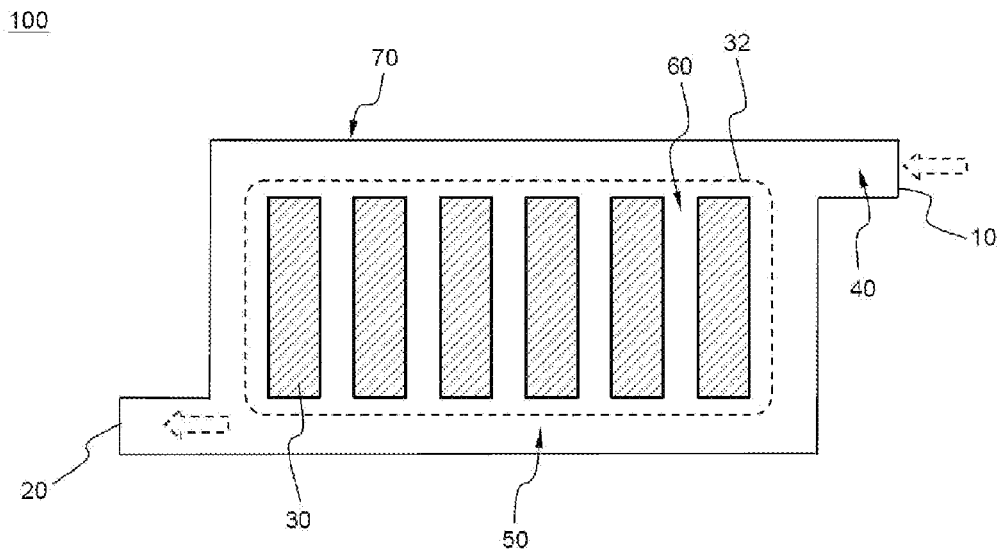
FIG. 2 is a vertical sectional view typically illustrating the middle or large-sized battery pack of FIG. 1.

FIG. 1 is a perspective view typically illustrating a middle or large-sized battery pack configured to have a structure in which a battery module is mounted in a conventional middle or large-sized battery pack case, and FIG. 2 is a vertical sectional view typically illustrating the middle or large-sized battery pack of FIG. 1.

Referring to these drawings, a middle or large-sized battery pack 100 includes a battery module 32 configured to have a structure in which six unit modules 30 are stacked such that the unit modules 30 are electrically connected to each other, a battery pack case 70 in which the battery module 32 is mounted, a coolant introduction part 40, as a flow space, extending from a coolant inlet port 10 to the battery module 32, and a coolant discharge part 50, as another flow space, extending from the battery module 32 to a coolant outlet port 20. Also, each of the unit modules 30 includes four battery cells.

A coolant, introduced through the coolant inlet port 10, flows through the coolant introduction part 40 and coolant flow channels 60 defined between the respective unit modules 30. At this time, the coolant cools the battery modules 30. Afterwards, the coolant flows through the coolant discharge part 50 and is then discharged out of the battery pack case through the coolant outlet port 20.

The coolant introduction part 40 is formed in parallel to the direction in which the unit modules 30 are stacked. In this structure, a relatively high coolant flux is introduced into the coolant flow channels defined between the unit modules adjacent to the coolant outlet port 20, whereas a relatively low coolant flux is introduced into the coolant flow channels defined between the unit modules adjacent to the coolant inlet port 10, resulting in nonuniform cooling of the unit modules 30, and therefore, the temperature deviation between the unit modules adjacent to the coolant outlet port 20 and the unit modules adjacent to the coolant inlet port 10 is high. This phenomenon occurs because the coolant is concentrated at the coolant outlet port 20 side with the result that the temperature at the coolant inlet port 10 side increases.

Figure 3:
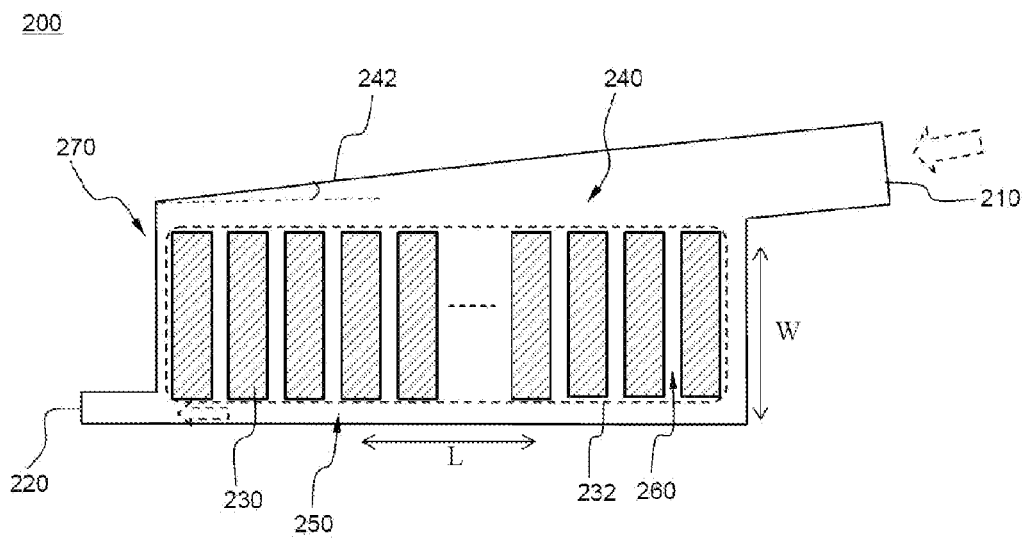
FIG. 3 is a vertical sectional view typically illustrating a middle or large-sized battery pack configured to have a structure in which a battery module is mounted in another conventional middle or large-sized battery pack case.

FIG. 3 is a vertical sectional view typically illustrating a middle or large-sized battery pack configured to have a structure in which a battery module is mounted in another conventional middle or large-sized battery pack case.

A middle or large-sized battery pack 200 of FIG. 3 is substantially identical to the middle or large-sized battery pack 100 of FIG. 1 in terms of the coolant discharge part 250 and coolant flow channels 60. However, the middle or large-sized battery pack 200 of FIG. 3 is different from the middle or large-sized battery pack 100 of FIG. 1 in that a coolant inlet port 210 and a coolant introduction part 240 are inclined at a predetermined angle to a battery pack case 270, and a battery module includes battery cells 230 instead of unit modules. That is, an upper end inside 242 of the coolant introduction part 240 is inclined at a predetermined angle toward the end of the battery pack case opposite to the coolant inlet port 210.

In this structure, it is known that the efficiency of cooling the battery cells adjacent to the coolant inlet port 210 is relatively high as compared with the middle or large-sized battery pack 100 of FIG. 1. However, in a case in which two inclination angles A and B are provided from the end opposite to a coolant inlet port 310 to the coolant inlet port 310, and the inclination angle B of the coolant inlet port 310 is greater than the inclination angle A of the end opposite to the coolant inlet port 310, as shown in FIG. 4, according to an installation condition of the battery pack in a device, it is not possible to achieve desired cooling efficiency if the inclination angle B does not satisfy a specific condition.

Figure 4:
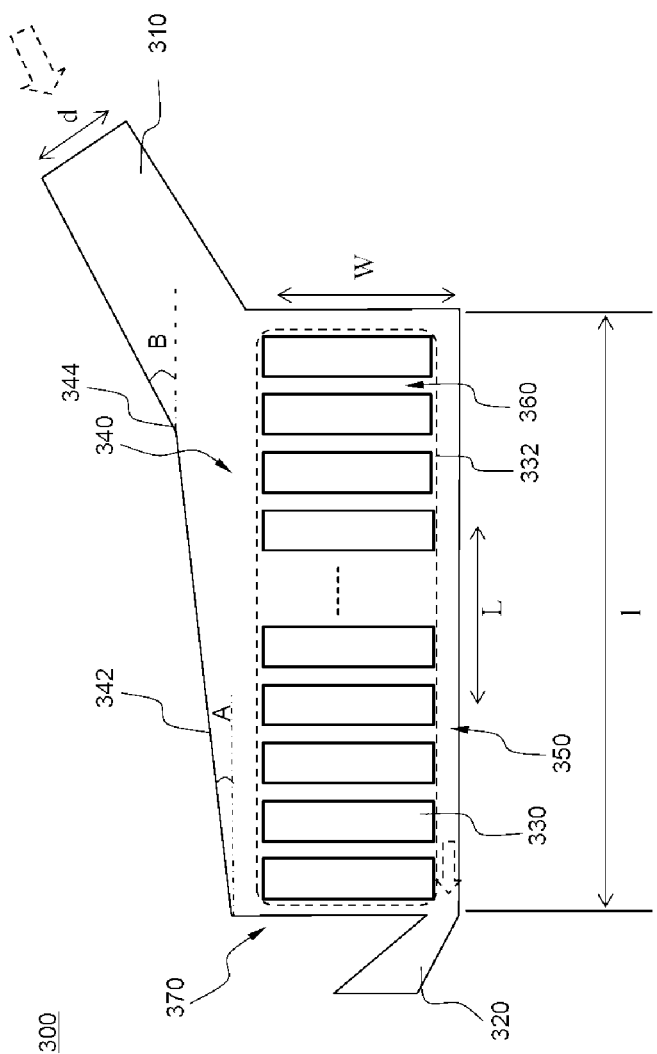
FIG. 4 is a vertical sectional view typically illustrating a middle or large-sized battery pack configured to have a structure in which a battery module is mounted in a battery pack case according to an embodiment of the present invention.

FIG. 4 is a vertical sectional view typically illustrating a middle or large-sized battery pack configured to have a structure in which a battery module is mounted in a battery pack case according to an embodiment of the present invention.

Referring to FIG. 4, a battery pack case 370 is configured to have a structure in which the length of the battery pack case 370 corresponding to the stacking direction L of battery cells 330 is greater than the length of the battery pack case 370 corresponding to the lateral direction W of the battery cells 330. Also, a coolant inlet port 310 and a coolant outlet port 320 are formed at the upper part and the lower part of the battery pack case 370, respectively, in opposite directions so that a coolant can flow from one side to the opposite side of the battery module 332 in the direction perpendicular to the stacking direction L of the battery cells 330.

Small coolant flow channels 360 are defined between the respective battery cells 330 so that the coolant can flow through the coolant flow channels 360. Consequently, the coolant, introduced through the coolant inlet port 310, flows through the coolant flow channels 360, thereby removing heat generated from the battery cells 330. After that, the coolant is discharged to the outside through the coolant outlet port 320.

The battery pack case 370 of FIG. 4 is different from the battery pack cases 70 and 270 illustrated in FIGS. 2 and 3 in that the inclination angle B of the coolant inlet port 310 of the battery pack case 370 of FIG. 4 is greater than the inclination angle A of the inclined plane starting from the end opposite to the coolant inlet port 310. Also, the width d of the coolant inlet port 310 is equivalent to approximately 15% of the length l of the battery pack case corresponding to the length of a battery cell stack 332, i.e. the battery module.

When the coolant, introduced through the coolant inlet port 310, flows along the coolant introduction part 340 having the inclination angle B of the coolant inlet port 310 and the inclination angle A of the inclined plane, the flow sectional area of the coolant is gradually decreased by the inclination angle A of the inclined plane according to the increase of the distance from an end 344 of the coolant inlet port 310. As a result, the flow speed of the coolant gradually increases while the coolant flux decreases, and therefore, all of the battery cells disposed adjacent to the coolant inlet port 310 and the battery cells remote from the coolant inlet port 310 are uniformly cooled while the coolant reaches the battery cells 330 remote from the coolant inlet port 310.

In order to increase coolant uniformity and thus minimize temperature deviation, the inclination angle A of the inclined plane and the inclination angle B of the coolant inlet port 310 are provided at an upper end inside 342 of the coolant introduction part 340 so that the inclination angle A of the inclined plane is approximately 4 degrees to the top of the battery cell stack 332, and the inclination angle B of the coolant inlet port 310 is approximately 20 degrees to the top of the battery cell stack 332. Also, the width d of the coolant inlet port 310 is equivalent to approximately 10% of the length l of the battery pack case 370.

Also, the battery pack case 370 is configured to have a two-stage inclined structure in which the inclination angle A of the end opposite to the coolant inlet port 310 is less than the inclination angle B of the coolant inlet port 310. Consequently, it is possible to prevent the occurrence of a phenomenon in which the coolant is concentrated at the coolant outlet port 20 side, thereby effectively preventing the temperature of the battery cells disposed adjacent to the coolant inlet port 310 from rising.

Figure 5:
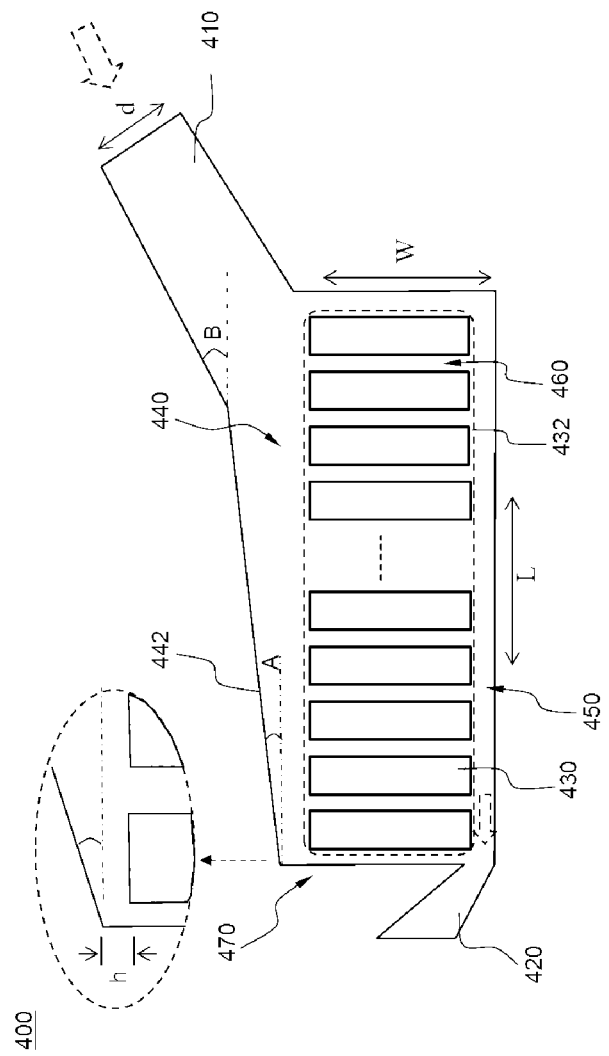
FIG. 5 is a vertical sectional view typically illustrating a structure in which the end opposite to a coolant inlet port is spaced from the top of a battery cell stack in the middle or large-sized battery pack of FIG. 4.

FIG. 5 is a vertical sectional view typically illustrating a structure in which the end opposite to a coolant inlet port is spaced from the top of a battery cell stack in the middle or large-sized battery pack of FIG. 4.

Referring to FIG. 5, the end opposite to a coolant inlet port 410 is spaced apart from the top of a battery cell stack 432 by a height h of approximately 1 mm. Consequently, only a restricted amount of the coolant, having passed along inclination angle B of the coolant inlet port and the inclination angle A of the inclined plane, reaches the end opposite to the coolant inlet port 410, thereby preventing battery cells 430 disposed adjacent to the end opposite to the coolant inlet port 410 from being excessively cooled.

Figure 6:
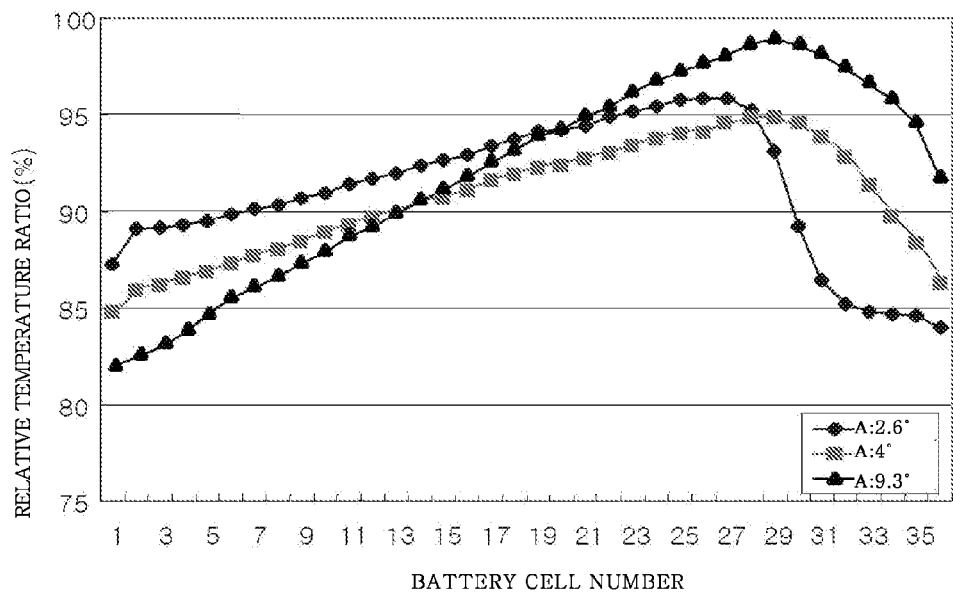
FIG. 6 is a graph illustrating the measurement results of the change in temperature of battery cells based on various inclination angles A of an inclined plane in the middle or large-sized battery pack of FIG. 4.

In connection with the above description, FIG. 6 is a graph illustrating the measurement results of the change in temperature of the battery cells based on various inclination angles A of the inclined plane in the middle or large-sized battery pack of FIG. 4.

Referring to FIG. 6 together with FIG. 4, FIG. 6 illustrates measurement results of the temperature of the battery cells stacked in the battery pack case 70 of FIG. 4 from the battery cell disposed the most adjacent to the coolant outlet port 370 to the battery cell disposed the most adjacent to the coolant inlet port 310. That is, battery cell number 1 indicates the battery cell disposed the most adjacent to the coolant outlet port, and battery cell number 35 indicates the battery cell disposed the most adjacent to the coolant inlet port. For reference, relative temperature ratios of the battery cells are expressed as relative values that can be comparable in a relationship between the respective test results.

The temperature measurement tests were carried out under a condition in which a predetermined load was applied to the battery cells and the external temperature was maintained at a level of room temperature. Also, the inclination angle B of the coolant inlet port was set to 45 degrees as a standard angle. The test results revealed that, when the inclination angle A of the inclined plane was 2.6 degrees, battery cell number 27 had a relative temperature ratio of 96%, and battery cell number 35 had a relative temperature ratio of 84%. That is, the temperature deviation between the battery cells was 12%. When the inclination angle A of the inclined plane was 4 degrees, battery cell number 29 had a relative temperature ratio of 95%, and battery cell number 1 had a relative temperature ratio of 85%. That is, the temperature deviation between the battery cells was 10%. When the inclination angle A of the inclined plane was 9.3 degrees, battery cell number 29 had a relative temperature ratio of 99%, and battery cell number 1 had a relative temperature ratio of 82%. That is, the temperature deviation between the battery cells was 17%. In conclusion, when the inclination angle B of the coolant inlet port was 45 degrees and the inclination angle A of the inclined plane was 4 degrees, the temperature deviation between the battery cells was 10%, which was the minimum.

Figure 7:
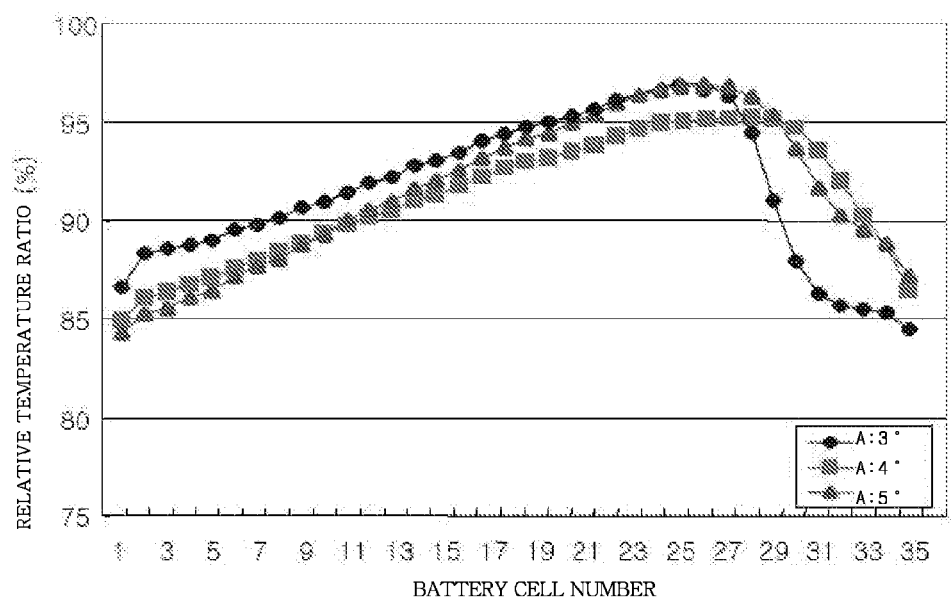
FIG. 7 is a graph illustrating the measurement results of the change in temperature of the battery cells based on other various inclination angles A of the inclined plane in the middle or large-sized battery pack of FIG. 4.

Referring to FIG. 7 together with FIG. 4, FIG. 7 is a graph illustrating measurement results of the temperature of the battery cells based on various inclination angles A of the inclined plane under the same test conditions as in FIG. 6. The test results revealed that, when the inclination angle A of the inclined plane was 3 degrees, battery cell number 26 had a relative temperature ratio of 96%, and battery cell number 1 had a relative temperature ratio of 84.5%. That is, the temperature deviation between the battery cells was 11.5%. When the inclination angle A of the inclined plane was 4 degrees, battery cell number 29 had a relative temperature ratio of 95%, and battery cell number 1 had a relative temperature ratio of 85%, as previously described with reference to FIG. 6. That is, the temperature deviation between the battery cells was 10%. When the inclination angle A of the inclined plane was 5 degrees, battery cell number 26 had a relative temperature ratio of 96%, and battery cell number 1 had a relative temperature ratio of 84.5%. That is, the temperature deviation between the battery cells was 11.5%.

In conclusion, when the inclination angle B of the coolant inlet port was 45 degrees and the inclination angle A of the inclined plane was 4 degrees, the temperature deviation between the battery cells was 10%, which was the minimum. Also, when the inclination angle B of the coolant inlet port was 45 degrees and the inclination angle A of the inclined plane were 3 degrees and 5 degrees, the temperature deviation between the battery cells was 11.5%. That is, it was confirmed that the temperature deviation gradually decreased as the inclination angle A of the inclined plane approached 4 degrees as compared with a case in which the inclination angle B of the coolant inlet port was 45 degrees and the inclination angle A of the inclined plane was 2.6 degrees and 9.3 degrees as in FIG. 6. Preferably, therefore, the inclination angle A of the inclined plane is 3 degrees to 5 degrees.

Figure 8:
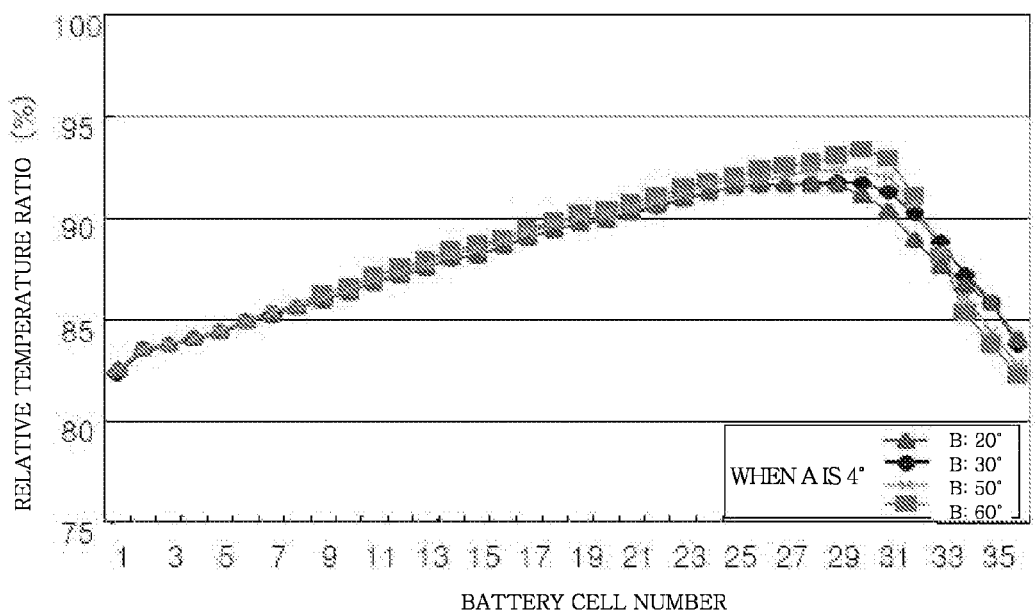
FIG. 8 is a graph illustrating the measurement results of the change in temperature of the battery cells based on various inclination angles B of the coolant inlet port when the inclination angle A of the inclined plane is 4 degrees in the middle or large-sized battery pack of FIG. 4.

Referring to FIG. 8 together with FIG. 4, FIG. 8 is a graph illustrating measurement results of the temperature of the battery cells based on various inclination angles B of the coolant inlet port when the inclination angle A of the inclined plane was set to 4 degrees having the minimum temperature deviation in FIG. 6 under the same test conditions as in FIG. 6.

The test results revealed that, when the inclination angle B of the coolant inlet port was 20 degrees, battery cell number 1, i.e. the battery cell disposed the most adjacent to the end opposite to the coolant inlet port, had a relative temperature ratio of 83%, and battery cell number 29 had a relative temperature ratio of 91%. That is, the temperature deviation between the battery cells was 8%. When the inclination angle B of the coolant inlet port was 30 degrees, battery cell number 1, i.e. the battery cell disposed the most adjacent to the end opposite to the coolant inlet port, had a relative temperature ratio of 83%, and battery cell number 31 had a relative temperature ratio of 92%. That is, the temperature deviation between the battery cells was 9%. When the inclination angle B of the coolant inlet port was 50 degrees, battery cell number 1, i.e. the battery cell disposed the most adjacent to the end opposite to the coolant inlet port, had a relative temperature ratio of 83%, and battery cell number 30 had a relative temperature ratio of 92%. That is, the temperature deviation between the battery cells was 10%. When the inclination angle B of the coolant inlet port was 60 degrees, battery cell number 1, i.e. the battery cell disposed the most adjacent to the end opposite to the coolant inlet port, had a relative temperature ratio of 83%, and battery cell number 30 had a relative temperature ratio of 94.5%. That is, the temperature deviation between the battery cells was 11.5%. In conclusion, it was confirmed that the temperature deviation when the inclination angle A of the inclined plane was 4 degrees and the inclination angle B of the coolant inlet port was 20 degrees is less than the temperature deviation when the inclination angle A of the inclined plane was 4 degrees and the inclination angle B of the coolant inlet port was 60 degrees and that the temperature deviation gradually decreased with reduction of the inclination angle B of the coolant inlet port. Also, the rate of increase of temperature deviation jumped within narrow limits when the inclination angle B of the coolant inlet port was 60 degrees. Preferably, therefore, the inclination angle B of the coolant inlet port is 20 degrees to 50 degrees.

Figure 9:
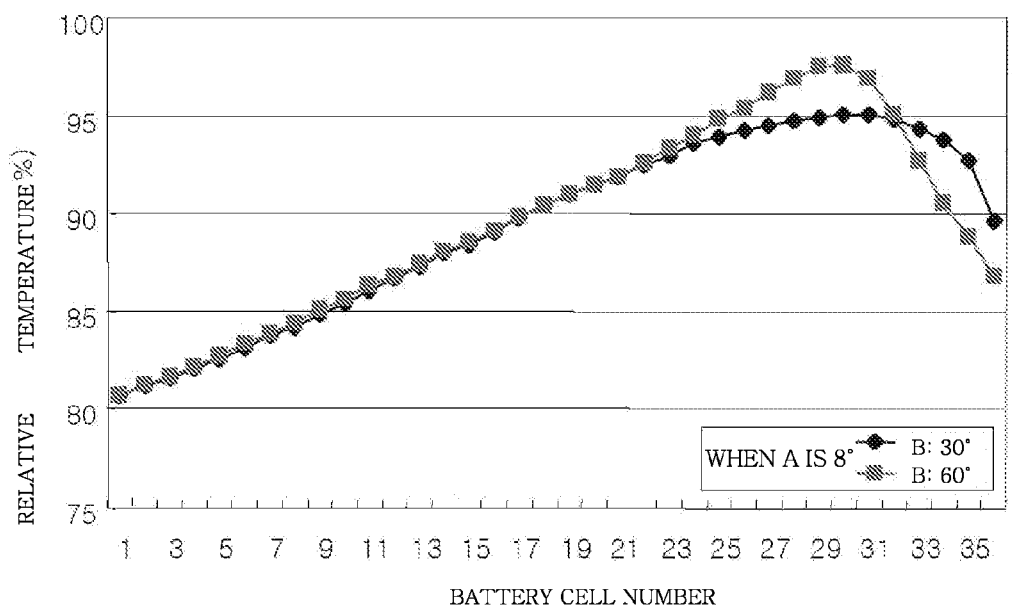
FIG. 9 is a graph illustrating the measurement results of the change in temperature of the battery cells based on various inclination angles B of the coolant inlet port when the inclination angle A of the inclined plane is 8 degrees in the middle or large-sized battery pack of FIG. 4.

Referring to FIG. 9 together with FIG. 4, FIG. 9 is a graph illustrating measurement results of the temperature of the battery cells based on various inclination angles B of the coolant inlet port when the inclination angle A of the inclined plane was set to 8 degrees under the same test conditions as in FIG. 6.

The test results revealed that, when the inclination angle B of the coolant inlet port was 30 degrees, battery cell number 1, i.e. the battery cell disposed the most adjacent to the end opposite to the coolant inlet port, had a relative temperature ratio of 81%, and battery cell number 31 had a relative temperature ratio of 95%. That is, the temperature deviation between the battery cells was 14%. When the inclination angle B of the coolant inlet port was 60 degrees, battery cell number 1, i.e. the battery cell disposed the most adjacent to the end opposite to the coolant inlet port, had a relative temperature ratio of 81%, and battery cell number 29 had a relative temperature ratio of 97%. That is, the temperature deviation between the battery cells was 16%. In conclusion, it was confirmed that the temperature deviation when the inclination angle A of the inclined plane was 8 degrees and the inclination angle B of the coolant inlet port was 30 degrees is less than the temperature deviation when the inclination angle A of the inclined plane was 8 degrees and the inclination angle B of the coolant inlet port was 60 degrees.

Figure 10:
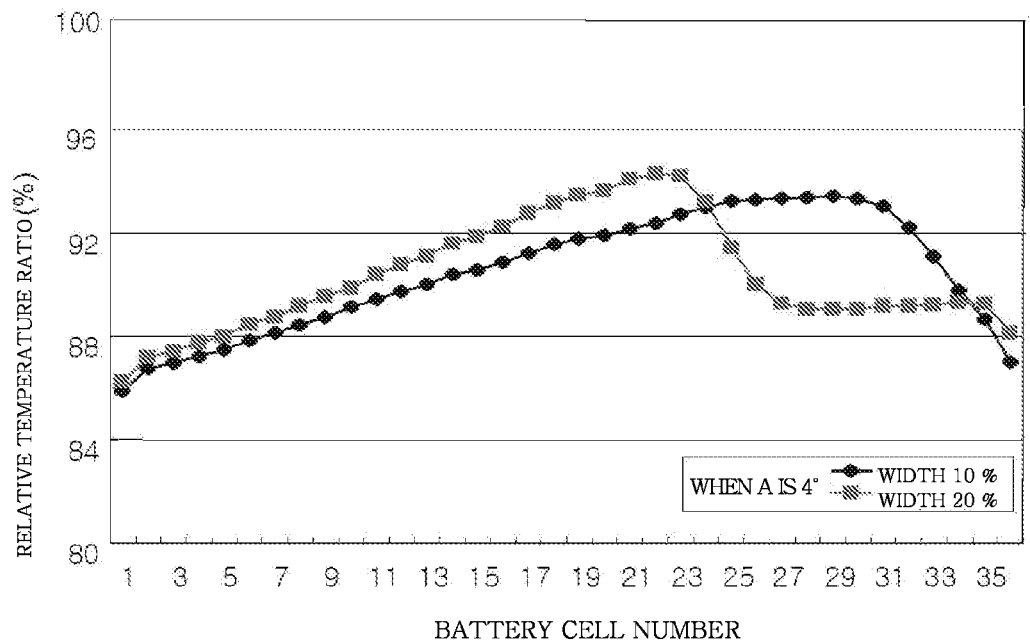
FIG. 10 is a graph illustrating the measurement results of the change in temperature of the battery cells based on various widths d of the coolant inlet port when the inclination angle A of the inclined plane is 4 degrees in the middle or large-sized battery pack of FIG. 4.

On the other hand, referring to FIG. 10 together with FIG. 4, FIG. 10 is a graph illustrating measurement results of the temperature of the battery cells based on various widths d of the coolant inlet port when the inclination angle A of the inclined plane was set to 4 degrees under the same test conditions as in FIG. 6.

The test results revealed that, when the width d of the coolant inlet port was 10% of the length l of the battery pack case, battery cell number 1, i.e. the battery cell disposed the most adjacent to the end opposite to the coolant inlet port, had a relative temperature ratio of 86%, and battery cell number 30 had a relative temperature ratio of 93%. That is, the temperature deviation between the battery cells was 7%. When the width d of the coolant inlet port was 20% of the length l of the battery pack case, battery cell number 1, i.e. the battery cell disposed the most adjacent to the end opposite to the coolant inlet port, had a relative temperature ratio of 86%, and battery cell number 21 had a relative temperature ratio of 94%. That is, the temperature deviation between the battery cells was 8%. In conclusion, it was confirmed that the temperature deviation when the inclination angle A of the inclined plane was 4 degrees and the width d of the coolant inlet port was 10% of the length l of the battery pack case is less than the temperature deviation when the inclination angle A of the inclined plane was 4 degrees and the width d of the coolant inlet port was 20% of the length l of the battery pack case.

Figure 11:
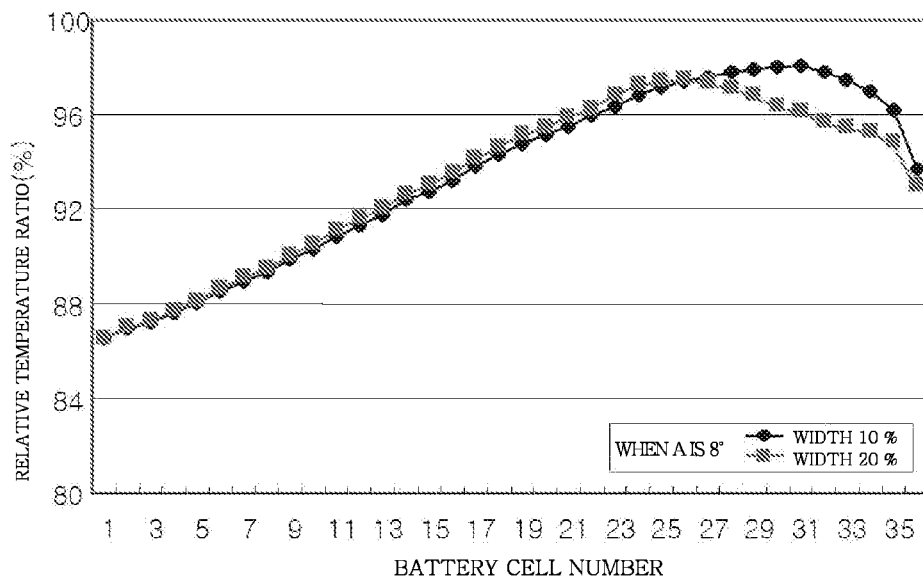
FIG. 11 is a graph illustrating the measurement results of the change in temperature of the battery cells based on various widths d of the coolant inlet port when the inclination angle A of the inclined plane is 8 degrees in the middle or large-sized battery pack of FIG. 4.

Referring to FIG. 11 together with FIG. 4, FIG. 11 is a graph illustrating measurement results of the temperature of the battery cells based on various widths d of the coolant inlet port when the inclination angle A of the inclined plane was set to 8 degrees under the same test conditions as in FIG. 6.

The test results revealed that, when the width d of the coolant inlet port was 10% of the length l of the battery pack case, battery cell number 1, i.e. the battery cell disposed the most adjacent to the end opposite to the coolant inlet port, had a relative temperature ratio of 87%, and battery cell number 32 had a relative temperature ratio of 98%. That is, the temperature deviation between the battery cells was 11%. When the width d of the coolant inlet port was 20% of the length l of the battery pack case, battery cell number 1, i.e. the battery cell disposed the most adjacent to the end opposite to the coolant inlet port, had a relative temperature ratio of 87%, and battery cell number 25 had a relative temperature ratio of 97%. That is, the temperature deviation between the battery cells was 10%. In conclusion, it was confirmed that the temperature deviation when the inclination angle A of the inclined plane was 8 degrees and the width d of the coolant inlet port was 10% of the length l of the battery pack case is greater than the temperature deviation when the inclination angle A of the inclined plane was 8 degrees and the width d of the coolant inlet port was 20% of the length l of the battery pack case.

Therefore, it can be seen that the temperature deviation is reduced when the width d of the coolant inlet port is smaller in a case in which the inclination angle A of the inclined plane is small. Also, it can be seen that the temperature deviation is reduced when the width d of the coolant inlet port is larger in a case in which the inclination angle A of the inclined plane is large.

FIG. 12 is a table illustrating the measurement results of FIGS. 6 to 9 and FIG. 13 is a table illustrating the measurement results of FIGS. 10 and 11.

Referring to FIG. 12, it can be seen that the temperature deviation between the battery cells is smallest when the inclination angle A of the inclined plane is 4 degrees in a case in which the inclination angle B of the coolant inlet port is 20 to 60 degrees. Also, it can be seen that the temperature deviation between the battery cells is minimized when the inclination angle B of the coolant inlet port is smaller in a case in which the inclination angle A of the inclined plane is 4 degrees.

Consequently, when the inclination angle B of the coolant inlet port is set to 20 to 60 degrees according to a specific condition of the internal structure of a device in which the middle or large-sized battery pack case is mounted, it is preferable to select the inclination angle A of the inclined plane within a range of 3 degrees to 5 degrees so as to achieve cooling uniformity.

Referring to FIG. 13, it can be seen that the temperature deviation between the battery cells is minimized when the width d of the coolant inlet port is smaller in a case in which the inclination angle A of the inclined plane is small. Also, it can be seen that the temperature deviation between the battery cells is minimized when the width d of the coolant inlet port is larger in a case in which the inclination angle A of the inclined plane is large.

INDUSTRIAL APPLICABILITY

As is apparent from the above description, when the middle or large-sized batter pack case is configured to have a structure in which the inclination angle B of the coolant inlet port is 20 to 80 degrees and the inclination angle A of the inclined plane is 3 to 8 degrees, it is possible to minimize temperature deviation between battery cells, to effectively remove heat build up between the battery cells, and to greatly improve the performance and life span of the battery cells.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A middle or large-sized battery pack case in which a battery module having a plurality of stacked battery cells or unit modules ('unit cells'), which can be charged and discharged, is mounted, wherein the battery pack case is provided at an upper part and a lower part thereof with a coolant inlet port and a coolant outlet port, respectively, which are directed in opposite directions so that a coolant for cooling the unit cells can flow from one side to the other side of the battery module in a direction perpendicular to a stacking direction of the unit cells, the battery pack case is further provided with a flow space ('a coolant introduction part') extending from the coolant inlet port to the battery module and another flow space ('a coolant discharge part') extending from the battery module to the coolant outlet port, an upper end inside of the coolant introduction part facing a top of a unit cell stack is configured to have an inclined plane inclined from an end opposite to the coolant inlet port toward the coolant inlet port at a positive (+) angle (A) to the top of the unit cell stack, the coolant inlet port is inclined at an angle (B) greater than the inclination angle (A) of the inclined plane so as to correspond to an internal structure of a device in which the middle or large-sized battery pack case, comprising the battery module, is mounted, the inclination angle (A) of the inclined plane is 3 to 8 degrees and the inclination angle (B) of the coolant inlet port is 20 to 80 degrees, the end opposite to the coolant inlet port is spaced apart from the top of the battery cell stack by a height equivalent to 10% or less of a height of the unit cell stack, and a transition from inclination angle (A) to inclination angle (B) is located at an intermediate portion of the battery module.

2. The middle or large-sized battery pack case according to claim 1, wherein the inclination angle (A) of the inclined plane is 3 to 5 degrees.

3. The middle or large-sized battery pack case according to claim 1, wherein the inclination angle (B) of the coolant inlet port is 20 to 50 degrees.

4. The middle or large-sized battery pack case according to claim 1, wherein the coolant inlet port has a width equivalent to 5 to 25% of a length of the battery pack case corresponding to a length of the unit cell stack.

5. The middle or large-sized battery pack case according to claim 1, wherein the end opposite to the coolant inlet port is spaced apart from the top of the battery cell stack by a height of 1 to 10 mm.

6. The middle or large-sized battery pack case according to claim 1, wherein the battery pack case is configured so that a length of the battery pack case in the stacking direction of the unit cells is greater than a length of the battery pack case in a lateral direction of the unit cells.

7. The middle or large-sized battery pack case according to claim 1, wherein the coolant discharge part has a uniform height with respect to a bottom of the unit cell stack.

8. The middle or large-sized battery pack case according to claim 1, wherein the battery pack case is configured to have a structure in which a blowing fan is further mounted in the coolant inlet port or the coolant outlet port for moving the coolant, introduced through the coolant inlet port, to the coolant outlet port, after the coolant flows through the battery module.

9. A middle or large-sized battery pack configured to have a structure in which a battery module is mounted in a middle or large-sized battery pack case according to claim 1.

10. The middle or large-sized battery pack according to claim 9, wherein the battery pack is used as a power source for electric vehicles, hybrid electric vehicles or plug-in hybrid electric vehicles.

11. A middle or large-sized battery pack configured to have a structure in which a battery module is mounted in a middle or large-sized battery pack case according to claim 2.

12. The middle or large-sized battery pack according to claim 11, wherein the battery pack is used as a power source for electric vehicles, hybrid electric vehicles or plug-in hybrid electric vehicles.

13. A middle or large-sized battery pack configured to have a structure in which a battery module is mounted in a middle or large-sized battery pack case according to claim 3.

14. The middle or large-sized battery pack according to claim 13, wherein the battery pack is used as a power source for electric vehicles, hybrid electric vehicles or plug-in hybrid electric vehicles.

15. A middle or large-sized battery pack configured to have a structure in which a battery module is mounted in a middle or large-sized battery pack case according to claim 4.

16. The middle or large-sized battery pack according to claim 15, wherein the battery pack is used as a power source for electric vehicles, hybrid electric vehicles or plug-in hybrid electric vehicles.

17. A middle or large-sized battery pack configured to have a structure in which a battery module is mounted in a middle or large-sized battery pack case according to claim 8.

18. The middle or large-sized battery pack according to claim 17, wherein the battery pack is used as a power source for electric vehicles, hybrid electric vehicles or plug-in hybrid electric vehicles.

* * * * *